United States Patent [19]

Hayase et al.

[11] Patent Number: 4,525,978
[45] Date of Patent: Jul. 2, 1985

[54] STERILIZING SYSTEM FOR FILLED AND SEALED ARTICLES

[75] Inventors: Masao Hayase; Yozo Araki, both of Nagoya, Japan

[73] Assignees: Mitsubishi Jukogyo Kabushiki Kaisha, Tokyo; House Food Industrial Co., Ltd., Osaka, both of Japan

[21] Appl. No.: 413,254

[22] Filed: Aug. 31, 1982

[30] Foreign Application Priority Data

Sep. 17, 1981 [JP] Japan ............................. 56-145452
Sep. 18, 1981 [JP] Japan ........................ 56-137539[U]
Sep. 18, 1981 [JP] Japan ............................. 56-146095
Sep. 18, 1981 [JP] Japan ............................. 56-146096

[51] Int. Cl.³ ............................................. B65B 35/30
[52] U.S. Cl. ..................................... 53/167; 53/540; 414/102
[58] Field of Search .............. 53/167, 425, 426, 540, 53/541; 414/43, 49, 96, 101, 102, 126; 422/26, 297, 300, 302, 304

[56] References Cited

U.S. PATENT DOCUMENTS 3,776,395 12/1973 Lingg et al. ..................... 414/102
4,222,311 9/1980 Jaton ................................ 414/102

FOREIGN PATENT DOCUMENTS 25090 7/1980 Japan .

Primary Examiner—John Sipos
Assistant Examiner—Richard M. Mudd
Attorney, Agent, or Firm—Birch, Stewart, Kolasch & Birch

[57] ABSTRACT

An improved sterilizing system for filled and sealed articles which are treated by way of the steps of filling a content into packing means and sealing the filled articles in a filling and sealing station, loading a tray with the filled and sealed articles, building up a tray stack including a predetermined number of loaded trays stacked thereon, sterilizing the tray stacks in a sterilizer and then conveying them to a packing station, wherein the improvement consists in an arrangement of a combination of a tray stack building station for building up a tray stack including a predetermined number of empty trays recovered after the filled and sealed articles are released toward the packing station, a tray stack holding conveyor for holding a plurality of tray stacks built up in said tray stack building station and a tray extracting station in which the empty trays are extracted from the tray stack conveyed from said tray stack holding conveyor one by one and then they are delivered toward the filling and sealing station. The sterilizing system further includes a tray stack holding conveyor having an ample holding capacity, said tray stack holding conveyor being located downstream of the sterilizer. The sterilizing system may be provided with an additional line of conveyance system including a sterilizer which is arranged in parallel to the aforesaid line of conveyance system including the sterilizer.

5 Claims, 11 Drawing Figures

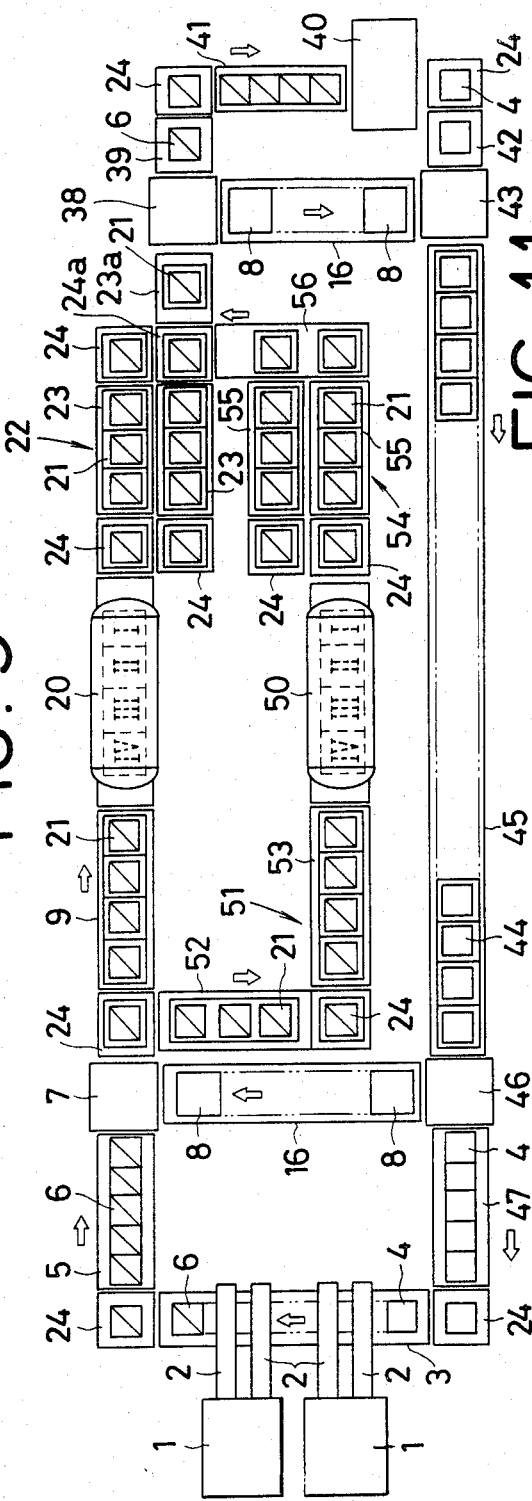
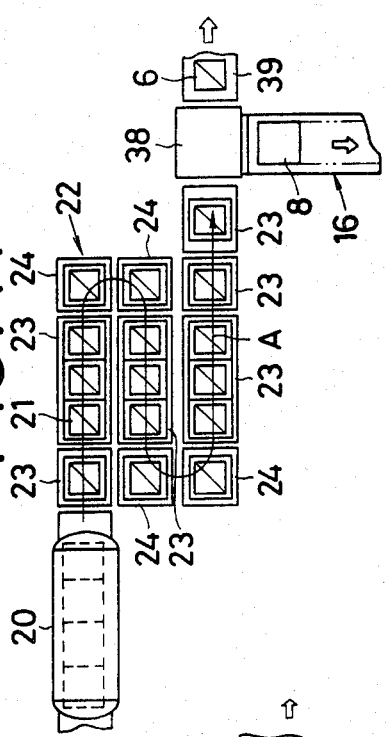
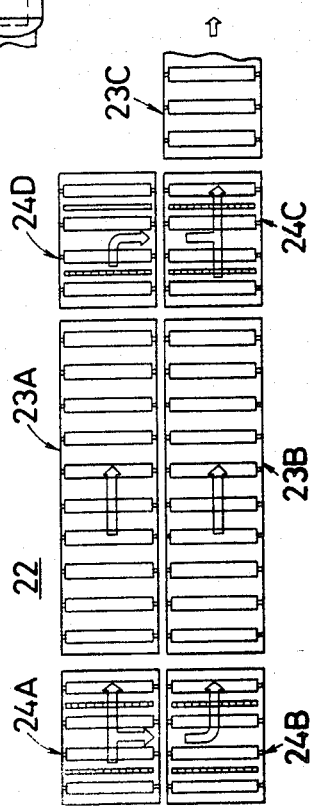

STERILIZING SYSTEM FOR FILLED AND SEALED ARTICLES

The present invention relates to an improved sterilizing system for filled and sealed articles.

To facilitate understanding of the present invention a typical conventional sterilizing system for filled and sealed articles will be described below with reference to FIG. 1.

In the drawing reference numeral 01 designates a filling and sealing apparatus in which various kinds of contents are filled into packing means in the form of a bag, envelope or the like (used for retort-pouch foodstuff or the like) and the filled articles are sealed. The filled and sealed articles (hereinafter referred to simply as articles) are delivered therefrom on a conveyor 03 via a transfer mechanism 02 and then they are placed on an empty tray 04 on said conveyor 03. Reference numeral 05 designates a tray stacking apparatus in which a predetermined number of trays 06 loaded with the artlces are stacked one above another. One of the conventional tray stacking apparatuses is disclosed, for instance, in Japanese Patent Laid-Open No. 25090/80 and it is constructed such that the loaded trays 06 are stacked from above, one-by-one. Further, reference numeral 07 designates a holding conveyor which serves for holding thereon a predetermined number of tray stacks 09 including the predetermined number of loaded trays stacked in the tray stacking apparatus. Further, reference numeral 010 designates a sterilizer in which the plural tray stacks 09 are subjected to sterilization under high temperature and pressure steam atmosphere or with the use of hot water. After completion of the intended sterilization and subsequent cooling the tray stacks 09 are delivered onto another holding conveyor 011. Further, reference numeral 012 designate a tray unloading apparatus in which unloading is practiced for the tray stacks 09 in the reverse order relative to the aforesaid tray stacking apparatus 05 in such a manner that the sterilized trays are unloaded from the upper end of the tray stack 09 one by one and then they are placed on a conveyor 013. One of the conventional tray unloading apparatuses is disclosed, for instance, in Japanese Patent Laid-Open No. 25090/80. Further, reference numeral 014 designate a filled article extracting apparatus which serves for extracting the articles from the loaded tray 06 conveyed by the conveyor 013 and delivering them toward a packing station including a drying apparatus or the like (not shown). The empty trays 04 are carried back to a storing or holding area located upstream of the filling and sealing apparatus 01 with the aid of wagons, carriages or the like (not shown).

Owing to the arrangement that the conventional sterilizing system for filled and sealed articles includes the holding conveyor 07 located upstream of the sterilizer 010 and the holding conveyor 011 located downstream of the sterilizer 010 so as to temporarily hold a plurality of tray stacks 09 prior to sterilizing on the former and temporarily hold a plurality of tray stacks 09 after sterilizing on the latter it is ensured that supplying of the tray stacks to and discharging of the same from the sterilizer 010 are automatically carried out, but it is found that the conventional sterilizing system has the following drawbacks.

(i) The conventional sterilizing system takes about one hour until the loaded tray 06 reaches the conveyor 013 via the sterilizer 010 after the filling and sealing apparatus 01 starts its operation. The filled article extracting apparatus 014 and the packing station including the drying apparatus or the like start their operation just when the tray stack comes to the end of the conveyor 013.

This means that there is a so-called time lag relative to starting time of operation between the filling and sealing apparatus 01 and the packing station. Due to the time lag as mentioned above it becomes necessary to make an adjustment for operators who take charge of the filling and sealing apparatus 01 and other operators who take charge of the packing station separately as to a time when they have to arrive at their factory. Obviously, this sort of time adjustment is by no means desirable for laborer control in a company. To obviate the problem relative to the above time adjustment a remedial measure is usually taken in such a manner as to hold the sterilized tray stacks 09 and the sterilized trays 06 on the holding conveyor 011 and the conveyor 013 until the next morning. However, as is often the case with the conventional sterilizing system, the holding conveyor 011 and the conveyor 013 do not have a holding capacity enough to obviate the problem relative to the time lag as mentioned above. As will be readily apparent, the larger the sterilizer is constructed, the more the time lag becomes. Thus, shortage in the holding capacity becomes a serious problem.

(ii) In the conventional sterilizing system there is a necessity for manually placing a predetermined number of empty trays 04 on the wagon, carriage or the like after the sterilized articles are extracted from the tray stack by operating the filled article extracting apparatus 014 and then carrying them toward the filling and sealing apparatus 01. Thus, automatic recovery of the empty trays fails to be achieved.

(iii) In the event that any trouble takes place with the filled article extracting apparatus 014 or the packing station in the susequent process stops its operation, it becomes impossible to continue delivering of the empty trays 04 to the filling and sealing apparatus 01 in spite of the arrangement for holding the tray stacks 09 and the trays 06 on the holding conveyor 011 and the conveyor 013, resulting in stoppage of operation of the filling and sealing apparatus 01 and reduced efficiency in production.

This means that there is no necessity for holding the tray stacks 09 and the trays 06 on the holding conveyor 011 and the conveyor 013.

(iv) Further, when the sterilizer 010 stops its operation due to trouble, cleaning, inspection or the like, the articles prior to sterilizing are kept on the holding conveyor 07 until the sterilizer 010 starts its operation again. The larger the sterilizer 010 is constructed, the longer the articles are kept on the holding conveyor 07. As a result the content in the article becomes deteriorated and thereby its taste is adversely affected.

Hence, the present invention is intended to obviate the drawbacks inherent in the conventional sterilizing system for filled and sealed articles as described above. Specifically, the present invention consists in an improved sterilizing system for filled and sealed articles which are treated by way of the steps of filling a content into packing means and sealing the filled articles in a filling and sealing station, loading a tray with the filled and sealed articles, building up a tray stack including a predetermined number of loaded trays stacked thereon, sterilizing the tray stacks in a sterilizer and then conveying them to a packing station, wherein the system includes a tray stack building station for building up a tray stack including a predetermined number of empty trays recovered after the filled and sealed articles are released toward the packing station, a tray stack holding conveyor for holding a plurality of tray stacks built up in said tray stack building station and a tray extracting station in which the empty trays are extracted from the tray stack conveyed from said tray stack holding conveyor one by one and then they are delivered toward the filling and sealing station. Thus, it is an object of the present invention to provide a sterilizing system for filled and sealed articles which ensures automatic delivering of the empty trays from the filled article extracting station to the filling and sealing station and continuous operation of the system without any intermittence of operation of the filling and sealing station.

Further, the present invention consists in an improved sterilizing system for filled and sealed articles including a sterilizer in which the filled and sealed articles are subjected to sterilization, said sterilizer being located between a filling and sealing station and a packing station, a tray stack holding conveyor for holding a plurality of tray stacks thereon, said tray stack holding conveyor being located upstream of the sterilizer, and another tray stack holding conveyor for holding a plurality of sterilized tray stacks, said tray stack holding conveyor being located downstream of the sterilizer, wherein the system further includes a tray stack building station for building up a tray stack including a predetermined number of empty trays recovered after the filled and sealed articles are released toward the packing station, a tray stack holding conveyor for holding a plurality of tray stacks built up in said tray stack building station and a tray extracting station in which the empty trays are extracted from the tray stack conveyed from said tray stack holding conveyor one by one and then they are delivered toward the filling and sealing station. Thus, it is another object of the present invention to provide a sterilizing system for filled and sealed articles which is able to eliminate a time lag in operation between the filling and sealing station and the packing station, satisfactorily meet a requirement for an enlarged scale of sterilizer and ensure automatic delivering of empty trays from the filled article extracting station to the filling and sealing station and continuous operation of the system without any intermittence of operation of the filling and sealing station.

Further, the present invention consists in an improved sterilizing system for filled and sealed articles in which another line comprising a sterilizer, a tray stack holding conveyor upstream of said sterilizer and a tray stack holding conveyor located downstream of said sterilizer is arranged in parallel to the aforesaid line comprising the sterilizer, the tray stack holding conveyor located upstream of the sterilizer and the tray stack holding conveyor located downstream of the sterilizer. Thus, it is another object of the present invention to provide a sterilizing system for filled and sealed article which is able to eliminate a time lag in operation between the filling and sealing station and the packing ststion, satisfactorily meet a requirement for an enlarged scale of sterilizer and ensure automatic delivering of empty trays from the filled article extracting station to the filling and sealing station and continuous operation of the system without any intermittance of operation of the filling and sealing station and moreover without any necessity for allowing the filled and sealed articles to be kept for a long periof of time on the holding conveyor located upstream of the sterilizer before they are subjected to sterilization therein irrespective of stoppage of the sterilizer caused due to trouble, cleaning, inspection or the like or of any enlarged scale of sterilizer installed.

Furthermore, the present invention consists in an improved sterilizing system for filled and sealed articles in which a tray stack holding conveyor located downstream of the sterilizer is constructed of a conveyor including plural lines of conveyor units each of which comprises a roller conveyor and a corner transfer conveyor. Thus, it is still another object of the present invention to provide a sterilizing system for filled and sealed articles which is able to eliminate a time lag in operation between the filling and sealing station and the packing station, satisfactorily meet a requirement for an enlarged scale of sterilizer and ensure delivering of the filled and sealed articles from the sterilizer toward the packing station at an excellently high efficiency.

Other objects and advantageous features of the present invention will be readily understood from the reading of the following description made in connection with the accompanying drawings which illustrate three preferred embodiments of the present invention.

The accompanying drawings will be briefly described as follows.

FIG. 9 is a schematic plan view of a sterilizing system for filled and sealed articles in accordance with a modified embodiment of the present invention.

FIG. 10 is a plan view of a pallet holding conveyor located downstream of a sterilizer, and FIG. 11 is a partial schematic plan view of a modified pallet holding conveyor located downstream of the sterilizer.

Figure 1:
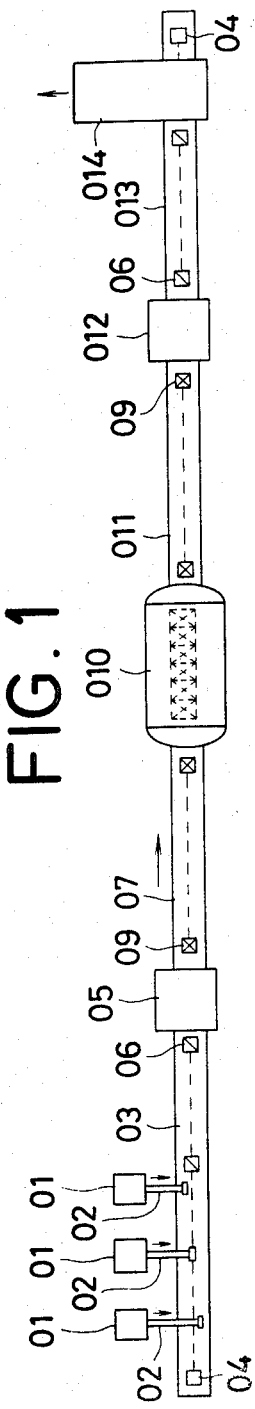
FIG. 1 is a schematic plan view illustrating a typical conventional sterilizing system for filled and sealed articles.

Now the present invention will be described in more details with reference to FIGS. 2 to 8 which illustrate a sterilizing system for filled and sealed articles in accordance with a preferred embodiment of the present invention.

In the drawings reference numeral 1 designates a filling and sealing apparatus in which various kinds of contents are filled in packing means such as bag or the like (not shown) and after completion of filling of the content sealing is effected for the filled packing means. Reference numeral 2 designates a loading apparatus adapted to receive the packed and filled articles (hereinafter referred to simply as articles) from said filling and sealing apparatus 1 and convey them toward a loading conveyor 3 in the form of a roller conveyor which is driven with the aid of driving means (not shown). A predetermined number of articles (16 artlces in the illustrated embodiment of the invention (see FIG. 3)) are loaded on each of empty trays 4 which are carried by the convyor 3 one after another.

Reference numeral 5 designates a tray holding conveyor which serves for holding a lot of trays 6 loaded with the articles. Further, reference numeral 7 designates a tray palletizer which serves for stacking a predetermined number of loaded trays 6 on a pallet 8 one above another and delivering a tray stack to a pallet holding conveyor 9.

Figure 8:
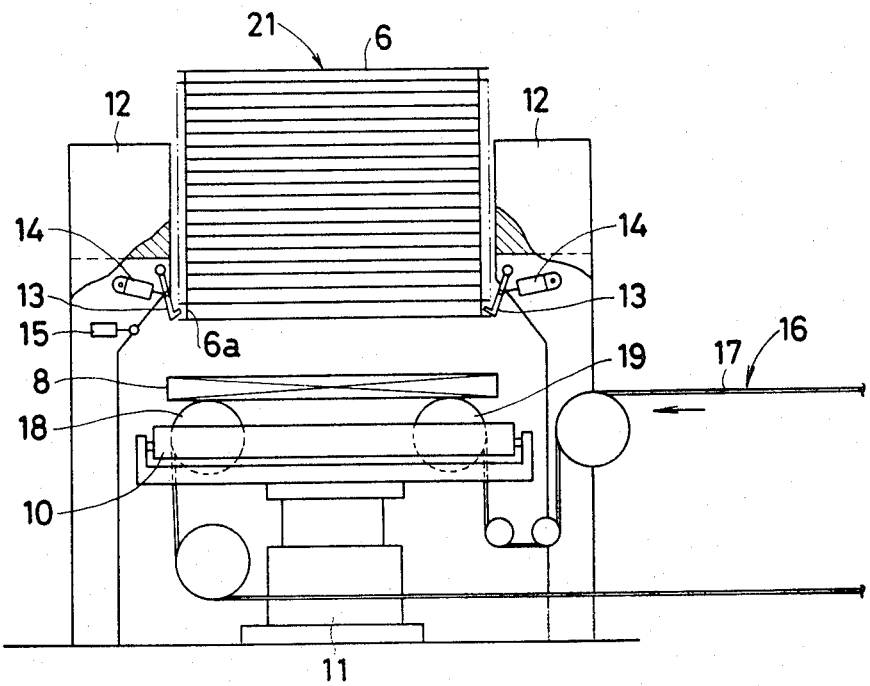
FIG. 8 is a side view of a pallet conveyor, shown in an enlarged scale.

Reference numeral 10 designates a roller conveyor disposed in the tray palletizer 7, said roller conveyor 10 being adapted to be driven with the aid of driving means (not shown). The roller conveyor 10 is fixedly mounted on a hydraulic cylinder 11 so as to be displaced upward or downward. Reference numeral 12 designates a frame for the tray palletizer 7 which is arranged in parallel to the direction of conveyance of the loaded trays 6 and includes a lever 13 pivotally supported therein, said lever 13 being formed with a ratch at its lower end. As the loaded tray 6 is raised up together with the roller conveyor 10, the ratch of the lever 13 comes in engagement with a rail 6$_a$ of the loaded tray 6 whereby the latter is held by the former. Specifically, the lever 13 is rotatable about its upper end held on the frame 12 with the aid of a pneumatic cylinder 14 so that it is displaced away from the loaded tray 6 so as not to cause any interference with upward or downward movement of the latter as long as it is inoperative. Reference numeral 15 designates a limit switch fixedly disposed on the frame for defining an upper limit of upward movement of the roller conveyor 10. Further, reference numeral 16 designates a pallet conveyor which is constituted of a chain conveyor 17, sprockets 18 and 19 and others, said pallet conveyor 16 serving to convey a pallet 8 on the roller conveyor 10 as illustrated in FIG. 8. It should be noted that the sprockets 18 and 19 are rotatably held by means of brackets or the like means (not shown).

Reference numeral 20 designates a sterilizer in which a tray stack 21 including a predetermined number of loaded trays stacked on the pallet 8 is subjected to sterilization under high temperature and pressure steam atmosphere and after completion of cooling it is delivered to a pallet holding conveyor 22 located downstream of the sterilizer 20.

The pallet holding conveyor 22 is constituted of roller conveyors 23 and corner transfer conveyors 24 and it is designed to have a capacity for holding a total number of tray stacks 21 delivered from the sterilizer 20 for a certain period of time and another tray stacks 21 to be held thereon while a packing station stops its operation. In the illustrated embodiment of the invention the pallet holding conveyor 22 is constututed of three roller conveyors 23 and four corner transfer conveyors 24.

Figure 6:
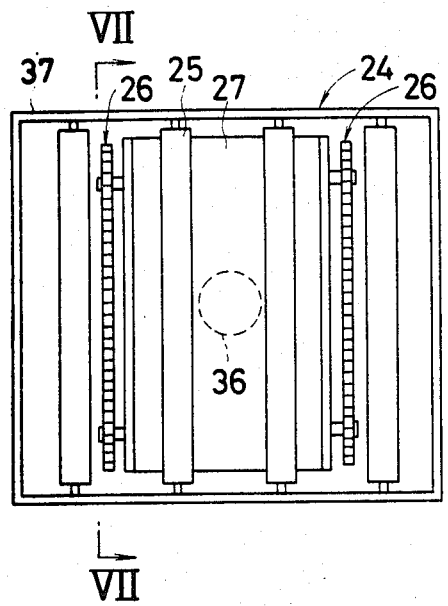
FIG. 6 is a plan view of a corner transfer conveyor, shown in an enlarged scale.
Figure 7:
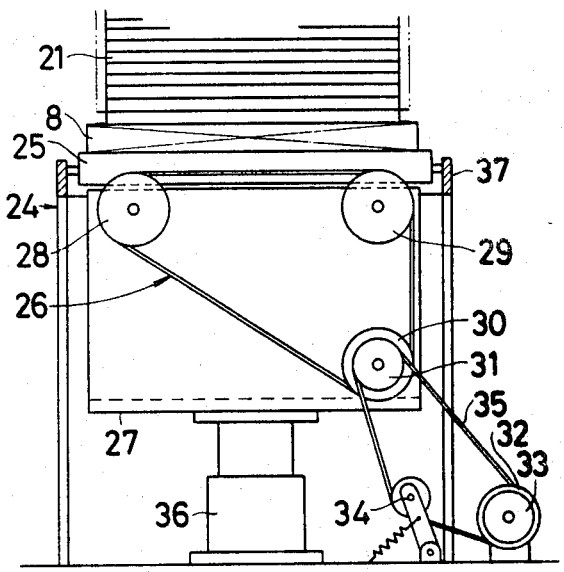
FIG. 7 is a vertical sectional view of the corner transfer conveyor, taken in line VII—VII in FIG. 6.

The corner transfer conveyor 24 is constituted of rollers 25 adapted to be rotated by means of a driving mechanism (not shown) and driving chain conveyors 26 (see FIGS. 6 and 7). Specifically, the driving chain conveyor 26 is constituted of sprockets 28, 29 and 30 rotatably supported by means of a bracket 27 having an U-shaped cross-sectional configuration, a sprocket 31 disposed coaxially relative to the sprocket 30, a chain 35 extended around the sprocket 31, a sprocket 32 located in the vicinity of a motor 32 and a tension sprocket 34, and a hydraulic cylinder 35 having the bracket fixedly mounted on the upper end thereof so that it is displaced upward or downward in the space formed between the adjacent two rollers 25 by means of the hydraulic cylinder 35. Further, reference numeral 37 designates a framework which serves for rotatably supporting the rollers 25.

Reference numeral 38 designates a tray depalletizer which is constructed in the same manner as the aforesaid tray palletizer 7 but it is operated in the reverse order of steps of removing the pallet 8 onto the pallet conveyor 16, drawing the loaded trays 6 from the bottom of the tray stack one by one and then displacing the drawn one onto the roller conveyor 39.

Further, reference numeral 40 designates a packed article extracting apparatus which serves for receiving the loaded tray 6 conveyed from the tray depalletizer 38 via the corner transfer conveyor 24 and the roller conveyor 41, extracting the articles therefrom, delivering them to the packing station including a drying apparatus and others each of which is not shown in the drawings, and delivering the empty trays 4 toward the tray palletizer 43 via the corner transfer conveyor 24 and the roller conveyor 42.

The tray palletizer 43 is constructed in the same manner as the aforesaid tray palletizer 7 and is operated by way of the steps of receiving the pallet 8 conveyed from the tray depalletizer 38 via the pallet conveyor 16, stacking a predetermined number of empty trays 4 to build up a tray stack 44 and then delivering the tray stack 44 onto the pallet holding conveyor 45.

The pallet holding conveyor 45 is arranged between the tray palletizer 43 and the tray depalletizer 46 and its holding capacity is determined so as to ensure continuous operation of the system without any intermittance of supply of the empty trays 4 to the filling and sealing apparatus 1 even when the packing station stops its operation.

The tray depalletizer 46 is constructed in the same manner as the aforesaid tray depalletizer 38 and is operated by way of the steps of receiving the tray stack 44 conveyed from the tray palletizer 43 via the pallet holding conveyor 45, separating it into the pallet 8 and the empty tray 4, delivering the former onto the pallet conveyor 16, drawing the empty trays 4 from the bottom of the tray stack one by one and then delivering them onto the roller conveyor 47. The empty trays 4 on the roller conveyor 47 are transferred to the filling and sealing apparatus 1 via the corner transfer conveyor 24.

Next, operations of the sterilizing system for filled and sealed articles constructed in the above-described manner will be described step by step in the following.

(a) The predetermined number of articles (not shown) filled with a specific content and then sealed in the filling and sealing apparatus 1 are delivered therefrom to the loading conveyor 3 via the loading apparatus 2 and loaded in an empty tray 4 on the loading conveyor 3. Then, the loaded tray is transferred to the tray palletizer 7 via the corner transfer conveyor 24 and the tray holding conveyor 5. The loaded trays 6 are conveyed to the tray palletizer 7 one after another with the aid of operating means (stoppers, limit switches and others) each of which is not shown in the drawings.

Figure 5:
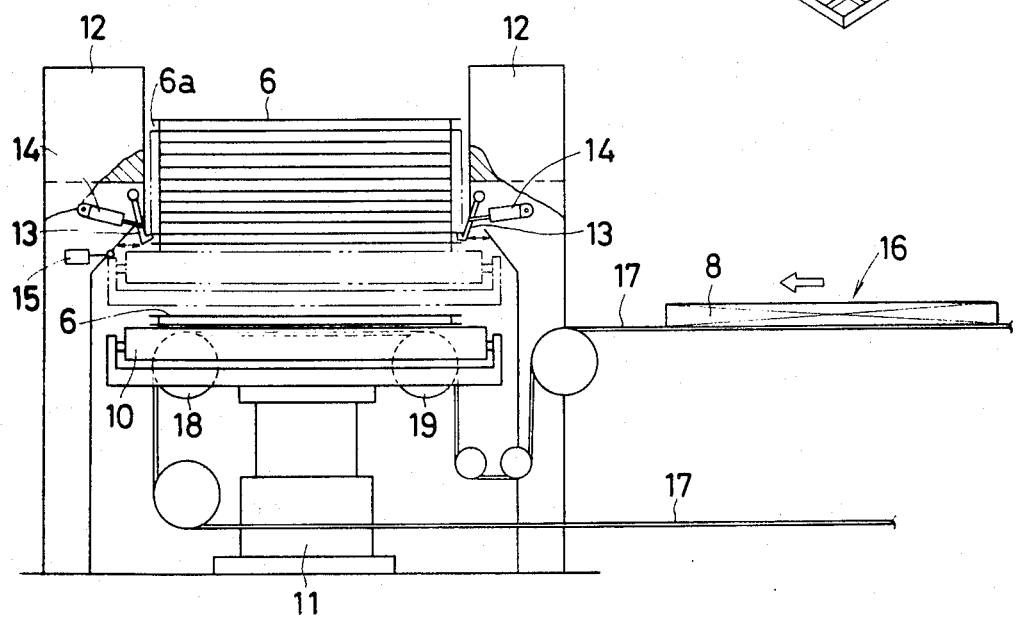
FIG. 5 is a cross-sectional front view of the sterilizing system taken in line V—V in FIG. 4.

(b) When the loaded tray 6 is placed on the roller conveyor 10 as illustrated in FIG. 5, the hydraulic cylinder 11 starts its upward movement. As the hydraulic cylinder 11 continues its upward movement and reaches a certain height as illustrated by chain lines where the limit switch 15 is actuated, the lever 13 moves forward to the position as illustrated by real lines and thereby the ratch on the lever 13 comes in engagement with the rail 6a of the loaded tray 6 whereby the latter is supported by the former. After completion of ratch engagement the conveyor 10 is lowered and waits for next loaded tray 6. When the next loaded tray 6 reaches the roller conveyor 10, the hydraulic cylinder 11 starts its upward movement again and the loaded tray 6 is brought in surface contact with the preceding loaded tray 6 which has been supported by the ratch of the lever 13. At this moment the limit switch 15 is actuated and thereby the lever 13 is caused to move backward, resulting in disengagement from the rail 6a of the tray 6. Then, the hydraulic cylinder 11 is raised up further by a height equal to the thickness of one tray and thereafter the lever 13 moves forward again until the ratch of the lever 13 comes in engagement with the rail 6a of the loaded tray 6. As a result the latter loaded tray 6 is supported together with the former loaded tray 6 by means of the lever 13. After completion of the second engagement the hydraulic cylinder 11 is lowered. By repeating the above-described steps of operations a required number of loaded trays 6 is stacked one above another until a tray stack is built up.

(c) After the predetermined number of loaded trays 6 are stacked, the roller conveyor 10 is lowered below the upper surface of the chain conveyor 17 and then the latter is driven to receive a pallet 8 at the position above the roller conveyor 10. Then, the latter starts its upward movement and lifts the received pallet 8. When the upper surface of the pallet 8 comes in contact with the bottom surface of the lowermost loaded tray 6, the lever 13 is caused to move backward. Thus, the tray stack 21 is placed on the pallet 8. Next, the roller conveyor 10 is lowered to the level as illustrated in FIG. 5. Now the tray stack 21 is ready to be delivered onto the pallet holding conveyor 9 located upstream of the sterilizer 20 by driving the roller conveyor 10.

(d) A predetermined number of tray stacks 21 (four stacks in the illustrated embodiment of the invention) held on the pallet holding conveyor 9 enter the sterilizer 20 and then they are subjected to sterilization under high temperature and pressure steam atmosphere. After completion of the intended sterilization and subsequent cooling they are delivered therefrom onto the pallet holding conveyor 22 located downstream of the sterilizer 20. The pallet holding conveyor 22 serves to arrange the tray stacks 21 delivered from the sterilizer 20 on the roller conveyors 23 and the corner transfer conveyors 24 in conformance with such a specific order of arrangements as identified by reference numerals I to IV in FIG. 2. Specifically, the tray stacks 21 are arranged over the pallet holding conveyor 22 in such a manner that a tray stack which first enters the sterilizer 20 is first delivered to the subsequent process eariest.

(e) Then, the pallet 8 is first removed from the tray stack 21 by operating the tray depalletizer 38 and then it is delivered onto the pallet conveyor 16, whereas the respective loaded trays 6 are drawn one by one from the bottom of the tray stack and then they are displaced toward the roller conveyor 39.

(f) The respective loaded trays 6 are conveyed to the filled article extracting apparatus 40 one after another via the corner transfer conveyor 24 and the roller conveyor 41 and the articles loaded on the tray 6 are extracted therefrom by operating the filled article extracting apparatus 40. After all the articles are extracted from the loaded tray 6, the empty tray 4 is conveyed to the tray palletizer 43 via the corner transfer conveyor 24 and the roller conveyor 42.

(g) The tray palletizer 43 is operated in the same manner as the tray palletizer 7 such that the empty trays 4 conveyed on the roller conveyor 42 are stacked one above another on the pallet 8 conveyed on the pallet conveyor 16 until a tray stack 44 including the predetermined number of empty trays is built up and then the tray stack 44 is delivered onto the pallet holding conveyor 45.

(h) The tray depalletizer 46 is operated in the same manner as the tray depalletizer 38 such that the tray stacks 44 conveyed on the pallet holding conveyor 45 are separated into the pallets 8 and the empty trays 4 and the former are delivered onto the pallet onveyor 16 while the latter are delivered onto the roller conveyor 47. The respective empty trays 4 are conveyed to the filling and sealing apparatus 1 one after another via the roller conveyor 47.

Now, advantageous features ensured by the sterilizing system for filled and sealed articles constructed in accordance with the present invention will be noted below.

Owing to the arrangement that the pallet holding conveyor 22 is provided downstream of the sterilizer 20 it is ensured that an increased holding capacity is attained whereby the sterilizing system is not affected by a so-called time lag between the filling and sealing station and the packing station. Further, since the pallet holding conveyor 22 located downstream of the sterilizer is easy to have an enlarged holding capacity, the sterilizing system of the present invention can readily meet requirements for operation in an increased scale. Furthermore, owing to the arrangement that the sterilizing system of the present invention includes the tray stack building station 43 where the empty trays conveyed from the packing station are stacked one above another, the pallet holding conveyor 45 for holding a lot of tray stacks delivered from the tray stack building station 43 and the tray extracting station comprising the tray depalletizer 46 and the roller conveyor 47 for extracting the empty trays from the bottom of the respective tray stacks conveyed from the pallet holding conveyor 45 and delivering them to the filling and sealing apparatus 1 it is ensured that the empty trays are automatically conveyed from the filled article extracting apparatus 41 to the filling and sealing apparatus 1. Furthermore, a number of empty trays 4 can be held on the pallet holding conveyor 45 in the form of a tray stack, even if any trouble takes place with the filled article extracting apparatus 40 or the packing station in the subsequent process, filling and sealing operations continues without any necessity for stopping operation of the filling and sealing apparatus 1. In the above-described embodiment the pallets 8 are employed for the sterilizing system but the present invention should be not limited only to this. Alternatively, tray stacks may be built up for the loaded trays 4 and the empty trays 6 without the use of the pallets 8. Further, in the above-mentioned embodiment the palletizers 7 and 43 and the depalletizers 38 and 46 are constructed such that stacking and extracting of the trays are initiated from the bottom part of the tray stacks, but the present invention should be not limited only to this. Alternatively, stacking or extracting may be initiated from the upper part of the respective tray stacks.

Figure 2:
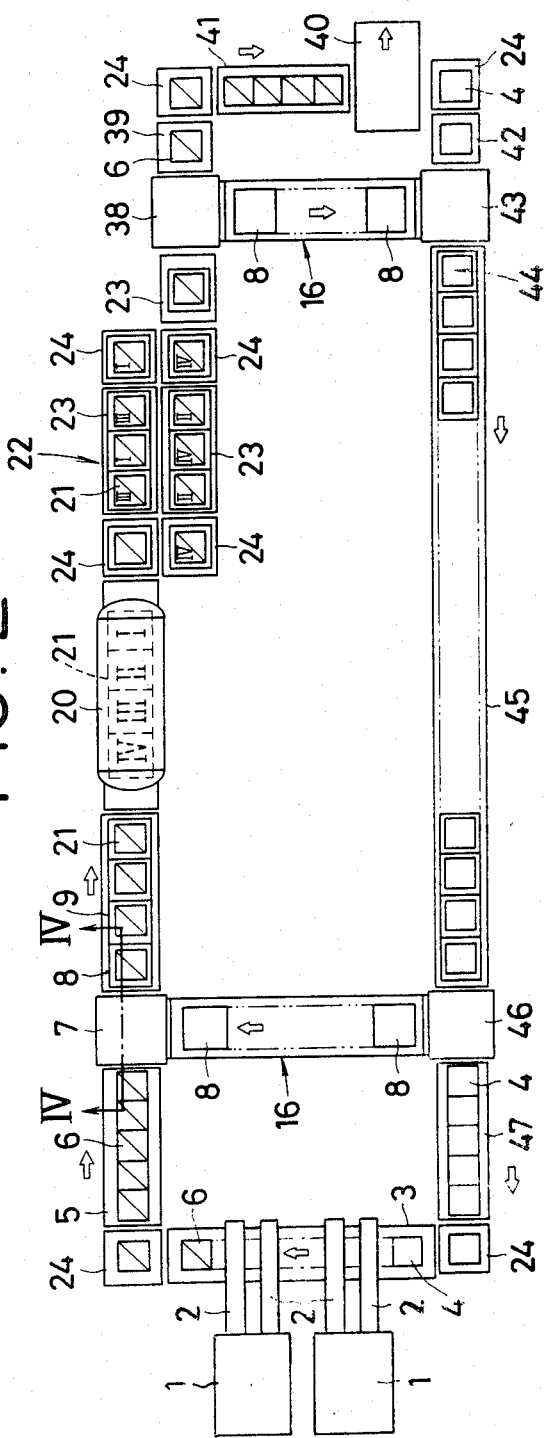
FIG. 2 is a schematic plan view of a sterilizing system for filled and sealed articles in accordance with a preferred embodiment of the present invention.
Figure 4:
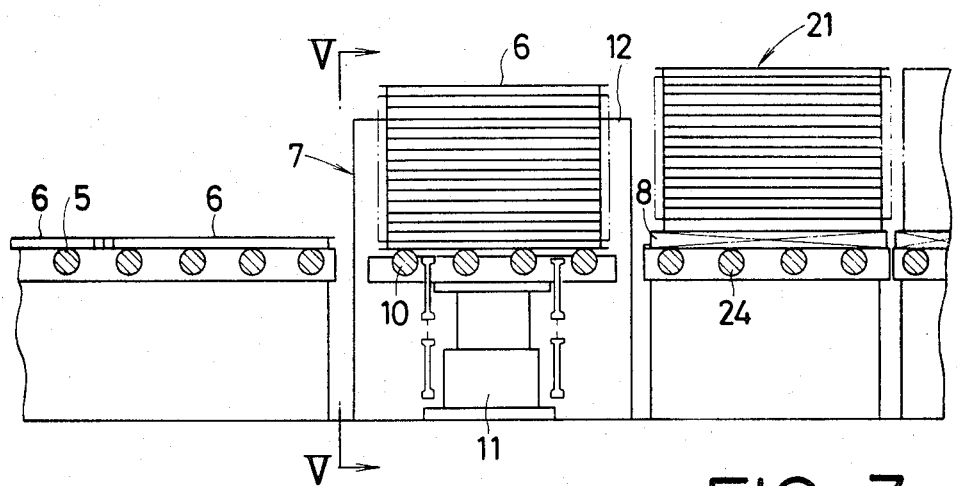
FIG. 4 is a partial sectional side view of the sterilizing system taken in line IV—IV in FIG. 2, shown in an enlarged scale.
Figure 3:
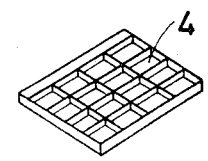
FIG. 3 is a perspective view of an empty tray.

Next, the sterilizing system in accordance with a modified embodiment of the present invention will be described below with reference to FIG. 9. It should be noted that same or similar members and components to those in FIG. 2 are given the same reference numerals.

In the drawing reference numeral 50 designates another sterilizer which is constructed and functions in the quitely same manner as the sterilizer 20. As is apparent from the drawing, the sterilizer 50 is arranged in parallel to the sterilizer 20. In addition to the pallet holding conveyor 9 another pallet holding conveyor 51 is provided which is operatively connected to the corner transfer conveyor 24. By properly operating the corner transfer conveyor 24 the tray stacks 21 are alternately delivered to the pallet holding conveyors 9 and 51. The pallet holding conveyor 51 is constituted of a roller conveyor 52, a corner transfer conveyor 24 and a roller conveyor 53.

Reference numeral 54 designates a pallet holding conveyor which is located downstream of the sterilizer 50. Said pallet holding conveyor 54 is constituted by a combination of roller conveyors 55, corner transfer conveyors 24 and a roller conveyor 56 and it is designed to have a capacity of holding a total number of tray stacks 21 corresponding to the so-called time lag and tray stacks 21 to be held during stoppage of the packing station. A corner transfer conveyor $24_a$ serves for alternately delivering the tray stacks 21 conveyed from both the pallet holding conveyors 22 and 54 onto a roller conveyor $23_a$.

Now, operations of the sterilizing system in accordance with the modified embodiment of the present invention as described above will be described in the following.

The tray stacks 21 including the predetermined number of trays stacked on the pallet 8 are built up in the tray palletizer 7 and then they are delivered onto the pallet holding conveyor 9 located upstream of the sterilizer 20 via the corner transfer conveyor 24 by driving the roller conveyor 10. It should be noted that the corner transfer conveyor 24 serves for alternately delivering the tray stacks 21 to the pallet holding conveyors 9 and 51 both of which are located upstream of the sterilizers 20 and 50.

After the predetermined number of tray stacks 21 are held on the pallet holding conveyor 9 or 51, they enter the sterilizer 20 or 50 in which they are subjected to sterilization under high temperature and pressure steam atmosphere, and after completion of the intended sterilization and subsequent cooling they are delivered onto the pallet holding conveyor 22 or 54 each of which is located downstream of the sterilizers 20 and 50. The pallet holding conveyor 22 or 54 located downstream of the sterilizer 20 or 50 serves to arrange the tray stacks 21 delivered from the sterilizer 20 or 50 in conformance with the same order of arrangements as identified by reference numerals I to IV in FIG. 2 with the aid of a combination of the roller conveyors 23 and the corner transfer conveyors 24 or a combination of the roller conveyors 55 and the corner transfer conveyors 24. Specifically, the tray stacks 21 are arranged over the pallet holding conveyor 22 or 55 in such a manner that a tray stack which enters the sterilizer eariest is delivered to the subsequent process eariest. Then, the corner transfer conveyor $24_a$ receives the tray stacks 21 from the pellet holding conveyors 22 and 54 alternately and delivers them to the roller conveyor $23_a$.

As will be apparent from the above description, the sterilizing system in accordance with the modified embodiment of the present invention has an additional advantageous feature that continuous operation of the system is ensured with either of the two sterilizers even if the other one stops its operation due to trouble, cleaning, inspection or the like. When the sterilizing system of the present invention is operated with the use of a plurality of sterilizers, it is possible to reduce a waiting time of the respective tray stacks prior to sterizing in proportion to the number of sterilizers installed. As a result undesirable problems such as deterioration of the filled content, changing in taste or the like will be effectively obviated.

As described above, the pallet holding conveyor 22 located downstream of the sterilizer 20 serves to arrange the tray stacks 21 delivered from the sterilizer 20 on both the roller conveyors 23 and the corner transfer conveyors 24 in conformance with such a specific order of arrangement as identified by reference numerals I to IV in FIG. 2. Now, the above step of operation will be described in a greater detail below with reference to FIG. 10. The corner transfer conveyor 24A is alternately operated in such a manner as to convey the tray stacks 21 identified by reference numerals I and III to the roller conveyor 23A and those identified by reference numerals II and IV to the corner transfer conveyor 24B. Specifically, when the tray stack 21 identified by reference numeral II is placed on the rollers 25 after the tray stack 21 identified by reference numeral I is delivered onto the roller conveyor 23A by rotating the rollers 25, the driving chain conveyor 26 is raised up above the upper surface of the rollers 25 and then the tray stack 21 identified by reference numeral II is conveyed to the corner transfer conveyor 24B by operating the driving chain conveyor 26. (At this moment the driving chain conveyor 26 on the corner transfer conveyor 24B is held at an elevated position and it is in operation.) As the driving chain conveyor 26 is lowered to the position as shown in FIG. 7, the tray stack 21 identified by reference numeral III is delivered from the sterilizer 20. Thus, The tray stack 21 identified by reference numeral III is conveyed to the roller conveyor 23A in the same manner as that identified by reference numeral I and then the follwoing tray stack 21 identified by reference numeral IV is conveyed to the corner transfer conveyor 24B in the same manner as that identified by reference numeral II. Further, the tray stacks 21 identified by reference numerals I and III are conveyed to the corner transfer conveyor 24D via the roller conveyor 23A one after another, whereas those identified by reference numerals II and IV are to the corner transfer conveyor 24C via the roller conveyor 23B one after another. As a result the tray stakcs 21 are conveyed to the roller conveyor 23C via the corner transfer conveyors 24D and 24C in conformance with the order identified by reference numerals I, II, III and IV.

Finally, FIG. 11 illustrates another preferred embodiment of the present invention in which the pallet holding conveyor 22 located downstream of the sterilizer 20 is constructed by three lines of combinations of the corner transfer conveyors 24 and the roller conveyors 23 and the tray stacks 21 are caused to move along the track of a S-shaped real line A in the direction as identified by an arrow mark.

It should be of course understood that the pallet holding conveyor 54 located downstream of the sterilizer 50 in FIG. 9 may be constructed in the same manner as the pallet holding conveyor 22 described above with reference to FIG. 11.

What is claimed is:

1. In a sterilizing system having a loading apparatus for loading onto trays, packed articles filled and sealed at a filling and sealing station, a first palletizer for loading said trays filled with said packed articles onto a pallet, a sterilizer for sterilizing filled and sealed articles disposed on said pallet, a first depalletizer for removing the trays from the pallet, one-by-one, which have been removed from said sterilizer and a packed-article extracting apparatus for removing filled and sealed articles loaded on said separated trays to a packing apparatus, the improvement which comprises a first pallet-transport conveyor for conveying said pallet having said trays separated therefrom, a second palletizer for supplying empty trays having said filled and sealed articles removed therefrom from said article extracting apparatus and loading said empty trays onto said pallet transported by said first pallet-transport conveyor, a pool transporting conveyor for pooling said pallet loaded with said empty trays, a second depalletizer for removing the trays one-by-one from said pallet transported by said pool transporting conveyor and for supplying trays to said loading apparatus and a second pallet-transport conveyor for transporting said pallet having said trays removed therefrom to said first palletizer.

2. In a sterilizing system having a loading apparatus for loading onto trays, articles filled and sealed at a filling and sealing station, a first palletizer for loading said trays filled with said articles onto a pallet, a first pool conveyor for pooling said pallet loaded with said trays, a sterilizer for sterilizing filled and sealed articles disposed on said pallet, a second pool conveyor for pooling said pallet taken from said sterilizer, a first depalletizer for removing the trays, one-by-one, from said pallet pooled by said second pool conveyor, and an article extracting apparatus for removing filled and sealed articles loaded on said separated trays to a packing apparatus, the improvement which comprises a first pallet-transport conveyor for conveying the pallet having said trays separated therefrom, a second palletizer for supplying the empty trays having said filled and sealed articles removed therefrom from said article extracting apparatus and loading said empty trays onto the pallet transported by said first pallet-transport conveyor, a third pool conveyor for pooling said pallet having said empty trays disposed thereon, a second depalletizer for removing the trays one-by-one from said pallet which is transported by said third pool conveyor and for supplying trays to said loading apparatus and a second pallet-transport conveyor for transporting said pallet having said trays removed therefrom to said first palletizer.

3. The sterilizing system for sterilizing filled and sealed articles as set forth in claim 2, wherein in parallel with said first pool conveyor, sterilizer and second pool conveyor, are provided another pool conveyor, sterilizer and pool conveyor.

4. The sterilizer for sterilizing filled and sealed articles, as set forth in claim 2, wherein said second pool conveyor comprises a plurality of rows, each consisting of a unit of roller conveyors and corner transfer conveyors.

5. The sterilizing system for filled and sealed articles as defined in claim 2, wherein the second pool conveyor is constructed of a conveyor including plural lines of conveyor units each of which comprises a roller conveyor and a corner transfer conveyor.

* * * * *